(12) United States Patent
Shinji et al.

(10) Patent No.: US 10,126,492 B2
(45) Date of Patent: Nov. 13, 2018

(54) PLASTIC IMAGE FIBER AND METHOD FOR FABRICATION OF SAME

(71) Applicant: KURARAY CO., LTD., Kurashiki-shi (JP)

(72) Inventors: Osamu Shinji, Tainai (JP); Tatsuya Ueda, Tainai (JP); Katashi Saito, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/025,791

(22) PCT Filed: Sep. 29, 2014

(86) PCT No.: PCT/JP2014/075891
§ 371 (c)(1),
(2) Date: Mar. 29, 2016

(87) PCT Pub. No.: WO2015/046511
PCT Pub. Date: Apr. 2, 2015

(65) Prior Publication Data
US 2016/0245991 A1    Aug. 25, 2016

(30) Foreign Application Priority Data
Sep. 30, 2013 (JP) .................. 2013-203088

(51) Int. Cl.
*G02B 6/02* (2006.01)
*B29D 11/00* (2006.01)
*G02B 6/06* (2006.01)

(52) U.S. Cl.
CPC .... *G02B 6/02042* (2013.01); *B29D 11/00682* (2013.01); *G02B 6/02038* (2013.01);
(Continued)

(58) Field of Classification Search
None
See application file for complete search history.

(56) References Cited

U.S. PATENT DOCUMENTS 5,593,621 A    1/1997  Koike et al.
5,729,645 A    3/1998  Garito et al.
(Continued)

FOREIGN PATENT DOCUMENTS

EP    0 802 432 A1    10/1997
JP    60-119509 A    6/1985
(Continued)

OTHER PUBLICATIONS

Extended European Search Report dated May 3, 2017 in Patent Application No. 14846946.3.
(Continued)

*Primary Examiner* — Tina Wong
(74) *Attorney, Agent, or Firm* — Oblon, McClelland, Maier & Neustadt, L.L.P.

(57) ABSTRACT

The object of the present invention is to provide a plastic image fiber having a small optical transmission loss. The plastic image fiber comprises N (where N is an integer equal to or greater than 2) number of cores which are disposed within a cladding. The each of the cores has an index of reflection that continuously changes at a peripheral part of the core. The index of reflection at the peripheral part on a center side of the core is greater than an index of reflection at the peripheral part on a cladding side.

17 Claims, 11 Drawing Sheets

(52) U.S. Cl.
CPC ...... *B29K 2233/08* (2013.01); *B29K 2625/06* (2013.01); *G02B 6/06* (2013.01)

(56) References Cited

U.S. PATENT DOCUMENTS

| | | | |
|---|---|---|---|
| 5,734,773 | A | 3/1998 | Teshima et al. |
| 5,911,025 | A | 6/1999 | Garito et al. |
| 6,188,824 | B1 | 2/2001 | Teshima |
| 7,409,128 | B2 * | 8/2008 | Holcomb .......... H01S 3/094003 372/6 |
| 8,725,001 | B2 * | 5/2014 | Fini .................... G02B 6/02042 398/142 |
| 9,063,289 | B1 * | 6/2015 | Farmer ................ G02B 6/2821 |
| 9,664,850 | B2 * | 5/2017 | Fontaine .................. G02B 6/04 |
| 2003/0190130 | A1 | 10/2003 | Welker et al. |
| 2005/0265675 | A1 | 12/2005 | Welker et al. |
| 2010/0278486 | A1 * | 11/2010 | Holland ................. G02B 6/262 385/43 |
| 2011/0274398 | A1 | 11/2011 | Fini et al. |

FOREIGN PATENT DOCUMENTS

| | | |
|---|---|---|
| JP | 60-119510 A | 6/1985 |
| JP | 62-108208 A | 5/1987 |
| JP | 10-111427 | 4/1988 |
| JP | 63-143510 A | 6/1988 |
| JP | 64-18108 A | 1/1989 |
| JP | 02-291506 A | 12/1990 |
| JP | 08-114715 A | 5/1996 |
| JP | 08-248245 | 9/1996 |
| JP | 2000-028833 A | 1/2000 |
| JP | 2001-354711 A | 12/2001 |
| JP | 2005-134629 A | 5/2005 |
| JP | 2006-058740 | 3/2006 |
| JP | 2008-020796 A | 1/2008 |
| WO | 94/04949 A1 | 3/1994 |
| WO | 98/40768 A1 | 9/1998 |

OTHER PUBLICATIONS

International Search Report dated Dec. 9, 2014 for PCT/JP2014/075891 filed on Sep. 29, 2014.
Office Action dated Oct. 11, 2017, in Japanese Patent Application No. 2015-539425 (with English-language Translation).
Japanese Office Action dated Mar. 28, 2018, in Patent Application No. 2015-539425 (with English-language Translation).

* cited by examiner

FIG.14 ained within a cladding. For the sake of convenience in use, the image fiber generally has an outer diameter of several mm or less. Therefore, a diameter of the core should be within the micro meter range.

PLASTIC IMAGE FIBER AND METHOD FOR FABRICATION OF SAME

TECHNICAL FIELD

The present invention relates to a plastic image fiber.

BACKGROUND ART

In the industrial field or the medical field, an image fiber is used. The image fiber typically has such a configuration that a plurality of cores are disposed within a cladding. The number of pixels (the number of the cores) of the image fiber is, for example, 1000 or greater. In many image fibers, 2000 to tens of thousands of the cores are disposed within a cladding. For the sake of convenience in use, the image fiber generally has an outer diameter of several mm or less. Therefore, a diameter of the core should be within the micro meter range.

CITATION LIST

Patent Literature

[Patent Literature 1]
JP 1988-143510 A
[Patent Literature 2]
JP 1989-18108 A
[Patent Literature 3]
JP 1990-291506 A
[Patent Literature 4]
JP 2008-20796 A
[Patent Literature 5]
JP 1985-119510 A
[Patent Literature 6]
JP 1987-108208 A
[Patent Literature 7]
JP 2001-354711 A
[Patent Literature 8]
WO 1998/040768
[Patent Literature 9]
JP 1985-119509 A
[Patent Literature 10]
JP 1996-114715 A

SUMMARY OF INVENTION

Technical Problem

Many types of plastic fibers (monofibers) having such a configuration that a single piece of core is disposed within a cladding has been proposed. A plastic fiber having a large diameter (e.g., a plastic fiber having a core diameter of about 1 mm) has been proposed. In the plastic fiber having a large diameter, an optical transmission loss has not been raised as a serious problem.

However, in a plastic fiber that has a core diameter of several μm or less and a cladding diameter of several mm or less showed a large optical transmission loss.

To solve the above described problem, the present invention is directed to provide a plastic image fiber with a small optical transmission loss.

Solution to Problem

Figure 1:
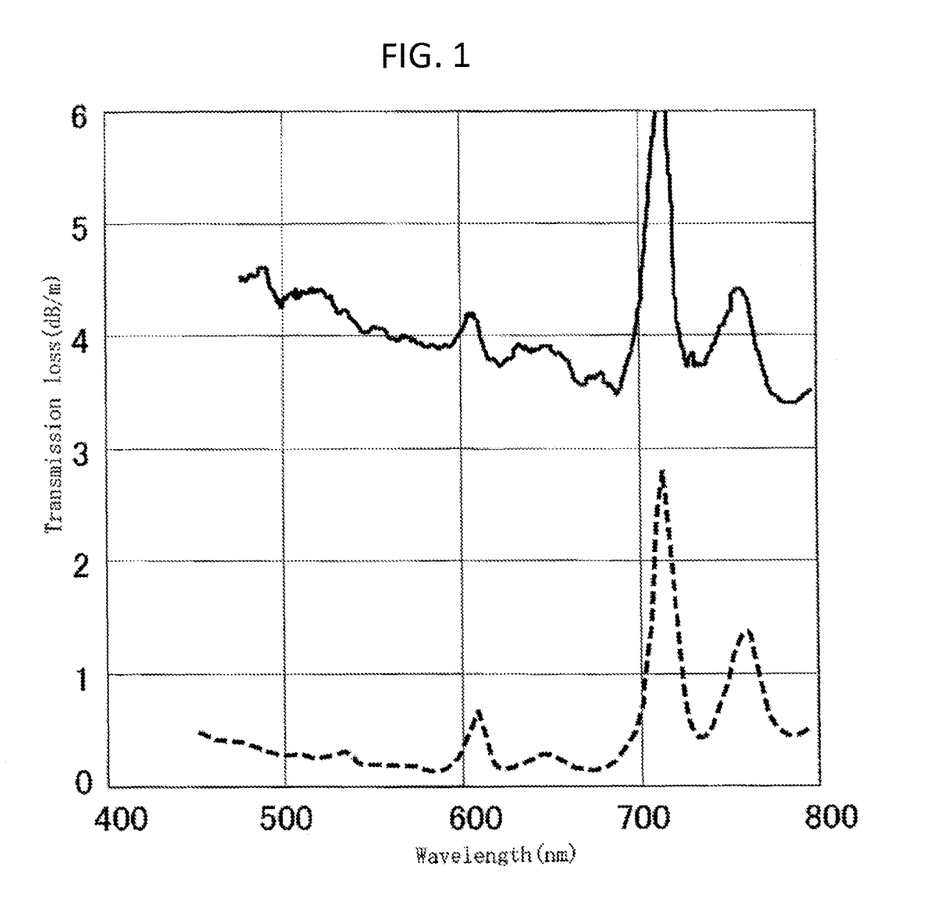
FIG. 1 is a graph illustrating a transmission loss characteristic.
Figure 2:
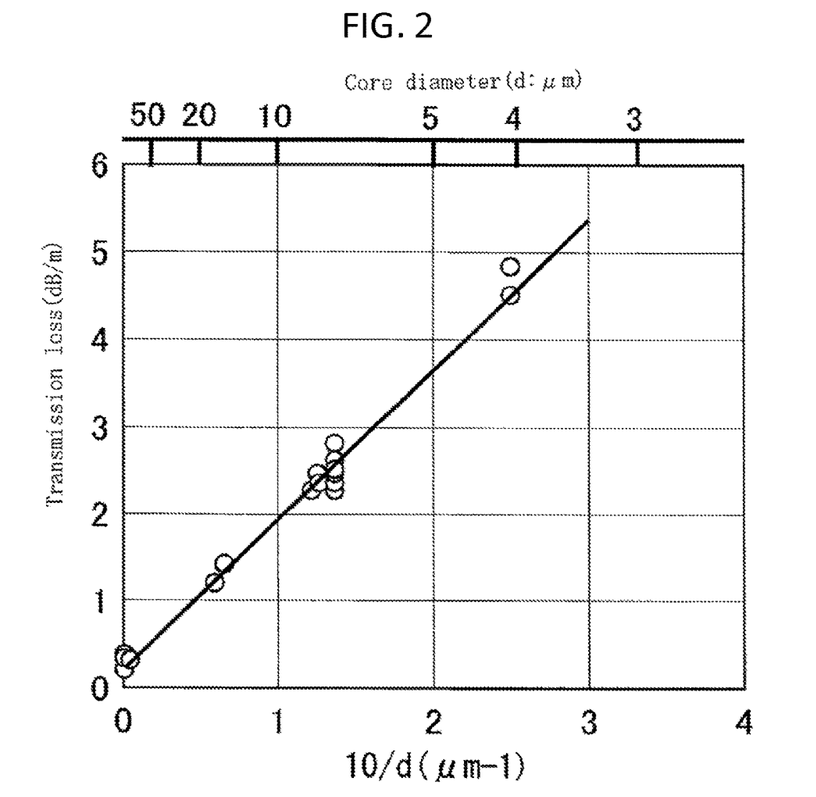
FIG. 2 is a graph illustrating another transmission loss characteristic.

States of optical transmission loss of the fiber are shown in FIG. 1 and FIG. 2. FIG. 1 is a graph illustrating a wavelength-transmission loss. FIG. 2 is a graph illustrating a core diameter-transmission loss of light (wavelength=500 nm). An upper line (solid line) in FIG. 1 shows an optical transmission loss of a plastic image fiber (a core diameter of 4.2 μm; the number of cores of 5000; and an outer diameter of a cladding of 500 μm). A lower line (dotted line) in FIG. 1 shows an optical transmission loss of a plastic monofiber (a core diameter of 960 μm; and an outer diameter of a cladding of 1000 μm). A core of the fiber is made of polystyrene. A cladding of the fiber is made of polymethyl methacrylate. FIG. 2 is a graph illustrating transmission losses of plastic optical fibers which have different core diameters. A horizontal axis of FIG. 2 shows ten times as a reciprocal of a core diameter d (μm). FIG. 2 also shows the core diameter d (μm). It is known from FIG. 2 that the transmission loss increases as the core diameter d becomes smaller and increases in proportion to the reciprocal of the core diameter d.

The optical transmission loss of the plastic monofiber (plastic fiber having a large diameter) is small. The optical transmission loss of the plastic image fiber is large. In a case of the plastic fiber having a large diameter, a transmission loss of light (wavelength=500 nm) was 0.3 dB/m (transmittance of 93.3%/m). In a case of the plastic fiber that is 3 m long, an optical transmittance was about 81%. In a case of the plastic image fiber, a transmission loss of light (wavelength=500 nm) was 4.5 dB/m (transmittance of 35.5%/m). In a case of the plastic image fiber that is 3 m long, a light transmittance was about 4%.

An extensive research and study have been performed with respect to the above described issues. As a result thereof, the followings are recognized.

Figure 3:
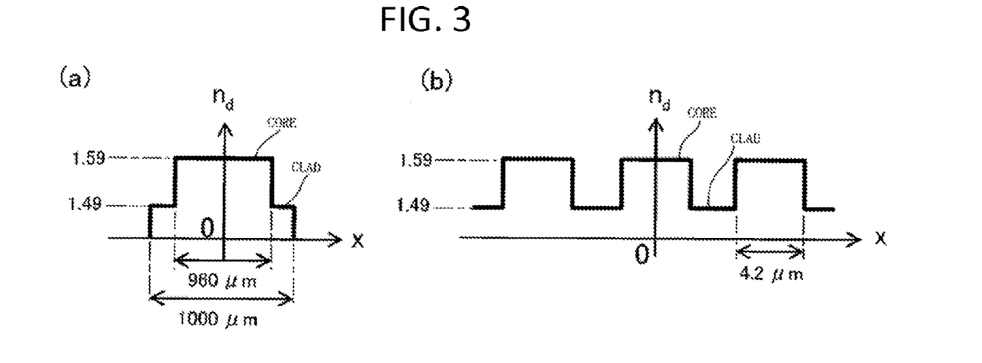
FIG. 3 is a graph illustrating a change of an index of reflection of a fiber.

FIG. 3 is a graph illustrating a change of an index of reflection of a fiber. In FIG. 3, a vertical axis ($n_d$) shows an index of reflection of the plastic image fiber 1. A horizontal axis (X) shows a distance in a direction perpendicular to a length direction of the plastic image fiber 1. FIG. 3(a) is a graph illustrating a change of an index of reflection of the plastic monofiber (a core diameter of 960 μm; and an outer diameter of cladding of 1000 μm). FIG. 3(b) is a graph illustrating a change of an index of reflection of the plastic image fiber (a core diameter of 4.2 μm; the number of cores of 5000; and an outer diameter of cladding of 500 μm). Both of FIG. 3(a) and FIG. 3(b) show a rectangular change of index of reflection.

Figure 4:
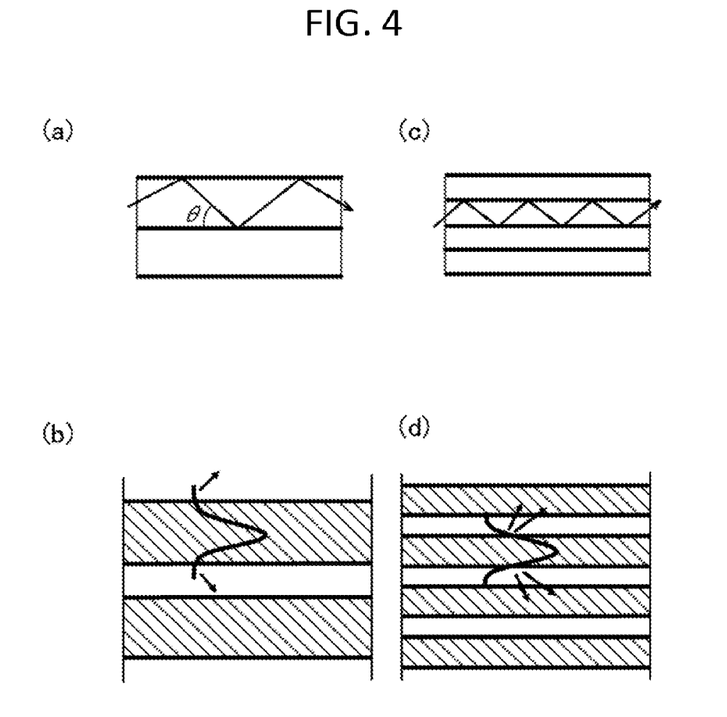
FIG. 4 schematically illustrates causes of occurrence of transmission loss.

FIG. 4 illustrates a light transmission state in the fiber. FIG. 4(a) and FIG. 4(b) each illustrates a light transmission state in a case of a fiber having a large core diameter. FIG. 4(c) and FIG. 4(d) each illustrates a light transmission state in a case of a fiber having a small core diameter.

Light trapped within the optical fiber propagates while the light totally reflects at an interface between a core and a cladding (see, FIG. 4). At the time, the number of times of light reflection at the core-cladding interface is greater in a case of the optical fiber having a small core diameter (FIG. 4(c) and FIG. 4(d)) than in a case of the optical fiber having a large core diameter (FIG. 4(a) and FIG. 4(b)). The number of times of light reflection increases in inverse proportion to the core diameter.

Condition of total reflection at a core-cladding interface of an optical fiber differs depending on a structure irregularity loss. A plastic fiber has a large structure irregularity loss as compared to a grass (quartz) fiber. The total reflection of the plastic fiber at its core-cladding interface is not 100%. The reflection occurs with scattering (reflectance at the interface is less than 100%). Therefore, a plastic image fiber having a small core diameter (having the large number of times of light reflection) has a large scattering loss (interface irregularity loss). It is known that the number of times of light reflection at the core-cladding interface increases as a core diameter of the plastic fiber becomes smaller and increases in inverse proportion to the core diameter of the plastic fiber. As shown in FIG. 1 and FIG. 2, the optical fiber having a small core diameter has a large transmission loss.

This can be understood based on also the wave theory. FIG. 4(b) and FIG. 4(d) schematically illustrate an intensity distribution of propagating light in a case of a large core diameter and in a case of a small core diameter, respectively. In FIG. 4(b) which illustrates a case of a large core diameter, light is effectively trapped within a core to be propagated through the core. In FIG. 4(d) which illustrates a case of a small core diameter, light is not satisfactory trapped within a core. Light propagates while it is widely distributed to a cladding around the core. If the interface between the core and the cladding is not smooth and has irregularity which causes light scattering, light exudes to the cladding. It is known that the light propagation is susceptible at the core-cladding interface when the core diameter of the fiber becomes small in view of also the wave theory.

Taking the above into consideration, the inventors of the present invention came to get the following clue. That is, a smooth interface between a core and a cladding (continuous change of an index of reflection at the peripheral part of the core) will preferably contribute to a plastic image fiber having a small core diameter.

The present invention was made based on the above described clue.

The present invention proposes a plastic image fiber comprising

N (where N is an integer equal to or greater than 2) number of cores which are disposed within a cladding, wherein each of the cores has an index of reflection that continuously changes at a peripheral part of the core, and wherein the index of reflection at the peripheral part on a center side of the core is greater than an index of reflection at the peripheral part on a cladding side.

The present invention proposes the plastic image fiber, wherein the core has a diameter in a range between 1 µm and 20 µm, wherein the number of the cores is equal to or greater than 1000, and wherein an outer diameter of the cladding is equal to or less than 4 mm.

The present invention proposes the plastic image fiber, wherein an index of reflection of the core at a position of the core contacting the cladding is identical to an index of reflection of the cladding at a position of the cladding contacting the core.

The present invention proposes the plastic image fiber, wherein an index of reflection from the peripheral part of the core through a position of the cladding on a vicinity side of the core is expressed by a monotone decreasing function.

The present invention proposes the plastic image fiber, wherein an index of reflection from a center part of the core through a position of the cladding on the vicinity side of the core is expressed by a monotone decreasing function.

The present invention proposes the plastic image fiber, wherein [$n_2$ (the maximum index of reflection in the core)–$n_1$ (the minimum index of reflection in the cladding)] is equal to or greater than 0.05.

The present invention proposes the plastic image fiber, wherein a change rate of an index of reflection is continuous from the peripheral part of the core through the position of the cladding on the vicinity side of the core.

The present invention proposes the plastic image fiber, wherein a change rate of an index of reflection is continuous from the center part of the core through the position of the cladding on the vicinity side of the core.

The present invention proposes a method for fabrication of a plastic image fiber comprising fabricating an aggregate of plastic fibers by binding a plurality of plastic fibers, heating and integrating the aggregate of plastic fibers to be formed into an integrated body, and thinning the integrated body obtained via the heating and integrating, wherein an index of reflection of each of the plastic fibers continuously changes at its peripheral part.

The present invention proposes the method for fabrication of a plastic image fiber, wherein, in each of the plastic fibers, an index of reflection at its peripheral part is expressed by the monotone decreasing function.

The present invention proposes the method for fabrication of a plastic image fiber, wherein, in each of the plastic fibers, an index of reflection from its center part to its peripheral part is expressed by the monotone decreasing function.

The present invention proposes the method for fabrication of a plastic image fiber, wherein, in each of the plastic fibers, the same index of reflection distributes at a predetermined range of its peripheral part.

The present invention proposes a method for fabrication of a plastic image fiber that is the plastic image fiber.

Advantageous Effect of Invention

An optical transmission loss becomes small. Sharp and clear images can be achieved.

Excellent flexibility can be realized.

DESCRIPTION OF EMBODIMENTS

A first invention is directed to a plastic image fiber. An embodiment of the fiber will be described below. The fiber comprises cladding(s). The fiber comprises cores. Each of the cores is disposed within the cladding. The fiber comprises at least two cores. Preferably, the fiber comprises 1000 or more cores. More preferably, the fiber comprises 2000 or more cores. There is no specific upper limit. Under the present technology, the fiber can comprises at most about 50000 cores. Improvement of technology in this field will make it possible to improve this upper limit. A preferable distance across (diameter of) the core is equal to or greater than 1 μm. More preferable diameter of the core is equal to or greater than 1.5 μm. Till now, the diameter of the core is actually equal to or greater than 2 μm. A preferable distance across (diameter of) the core is equal to or less than 20 μm. More preferable diameter of the core is equal to or less than 15 μm. Further preferable diameter of the core is equal to or less than 10 μm. A preferable outer diameter of the cladding is equal to or less than 4 mm.

In the core of the fiber, an index of reflection at a position of the core on a center side of the core in the peripheral part of the core is larger than an index of reflection at a position of the core on a cladding side in the peripheral part of the core. The index of reflection of the core continuously (substantially continuously:almost continuously (gradually (substantially gradually:almost gradually))) changes in the peripheral part of the core. For example, df (X)/dX is a continuous function. Where f(X) is an index of reflection in a distance X. Where X is a distance in a direction perpendicular to a length direction of an image fiber. The "continuously change" in the present invention means: When [a gap between both indexes of reflection] is equal to or less than [$n_2$ (the maximum index of reflection in the core)-$n_1$ (the minimum index of reflection in the cladding)]×0.01, the both indexes of reflection are considered as "being the same (substantially the same:almost the same)". Therefore, in a case where {[an index of reflection obtained when ΔX comes closer to 0 in $X_1$+ΔX (ΔX>0)]-[an index of reflection obtained when ΔX comes closer to 0 in $X_1$-ΔX (ΔX>0)] is equal to or less than [$n_2$ (the maximum index of reflection in the core)-$n_1$ (the minimum index of reflection in the cladding)]×0.01, a change of the index of reflection at a point ($X_1$) is considered as continuous.

In the fiber, preferably, an index of reflection of the core at a position of the core that contacts the cladding is identical (substantially identical:almost identical) to an index of reflection of the cladding at a position of the cladding that contacts the core.

In the fiber, preferably, an index of reflection from a peripheral part of the core through a position of the cladding on a vicinity side of the core is expressed by the monotone decreasing function. In the fiber, preferably, an index of reflection from a center part of the core through the position of the cladding on the vicinity side of the core is expressed by the monotone decreasing function.

In the fiber, preferably, [$n_2$ (the maximum index of reflection in the core)-$n_1$ (the minimum index of reflection in the cladding)] is equal to or greater than 0.05, more preferably, equal to or greater than 0.07, and further preferably, equal to or greater than 0.1.

The center part may be a point. The center part may be an area (e.g., an area having half of a core diameter: range). In the area of the center part, an index of reflection may be approximately constant. An index of reflection at a position of the center part of the core is greater than an index of reflection at a position of the outer peripheral part of the core.

In the plastic image fiber of the embodiment, the index of refection continuously changes at the boundary between the core and the cladding. Therefore, it is theoretically difficult to clearly define the boundary. Taking this into consideration, the area of core was defined in the following manner. The area of core is an area having an index of reflection equal to or greater than {$n_1$+0.05×($n_2$-$n_1$)}. Where $n_2$ is the maximum index of reflection in the core. Where $n_1$ is the minimum index of reflection in the cladding. The peripheral part of the core means an area in a range from an edge of the core area through an area having about ⅒ to ½ of a core radius toward the center side of the core. The area of the cladding is an area having an index of reflection of less than {$n_1$+0.05×($n_2$-$n_1$)}. The vicinity side of the core in the cladding is an area where an index of reflection is greater than $n_1$ and less than {$n_1$+0.05×($n_2$-$n_1$)}.

A distance between edges of the adjacent core areas (i.e., a value obtained by subtracting a diameter of a core from a distance between centers of the adjacent cores) is, preferably, in a range between 0.5 μm and 10 μm (both inclusive). If the distance is less than 0.5 μm, a problem of crosstalk becomes remarkable. This may raise a problem of insufficient resolution of an image fiber. However, even if the distance is greater than 10 μm, further improvement of the problem of crosstalk cannot be expected. There may be a case where a total area of cores to an area of image fiber becomes small and, as a result thereof, the image fiber can provide only dark images. More preferable distance is in a range between 0.6 μm and 5 μm (both inclusive). Further preferable distance is in a range between 0.7 μm and 3 μm (both inclusive). Specifically preferable distance is in a range between 0.8 μm and 1.5 μm (both inclusive).

The plastic image fiber of the embodiment is formed of plastic and, thus, is flexible. The plastic image fiber of the embodiment can be applied to a portion requiring flexibility. The plastic image fiber of the embodiment can be used in a health examination (e.g., a case where the fiber is inserted into a human body) without problem. The fiber is hardly broken. Therefore, the fiber is excellent in safety.

The plastic image fiber of the embodiment has a small optical transmission loss. This realizes a bright clear image.

A second invention is directed to a method for fabrication of a plastic image fiber. Specifically, the second invention is directed to a method for fabrication of the above described plastic image fiber. An embodiment of the method for fabrication of the above described plastic image fiber will be described below. The method includes a step of fabrication of an aggregate of plastic fibers. In the method, an aggregate of plastic fibers is fabricated by binding a plurality of plastic fibers. The method includes a heating and integrating step. In the heating and integrating step, the aggregate of plastic fibers is heated and integrated. Preferably, the heating and integrating step is performed by exhausting gas from gaps between the plastic fibers in the aggregate. For example, the step is performed under vacuum conditions. The method includes a thinning step. In the thinning step, the integrated body resulting from the heating and integrating step is drawn (thinned). In each of the plastic fibers, an index of reflection continuously changes at its peripheral part.

In each of the plastic fibers, preferably, an index of reflection at its peripheral part is expressed by the monotone decreasing function. In each of the plastic fibers, more preferably, an index of reflection from its center part to its peripheral part is expressed by the monotone decreasing function.

In each of the plastic fibers, preferably, the same index of reflection distributes at a predetermined range of its peripheral part (outside of its peripheral part). The peripheral part where there is no change of index of reflection is a part that is a cladding when the integrated body is thinned (when a plastic image fiber is obtained).

More detailed description thereof will follow.

Figure 5:
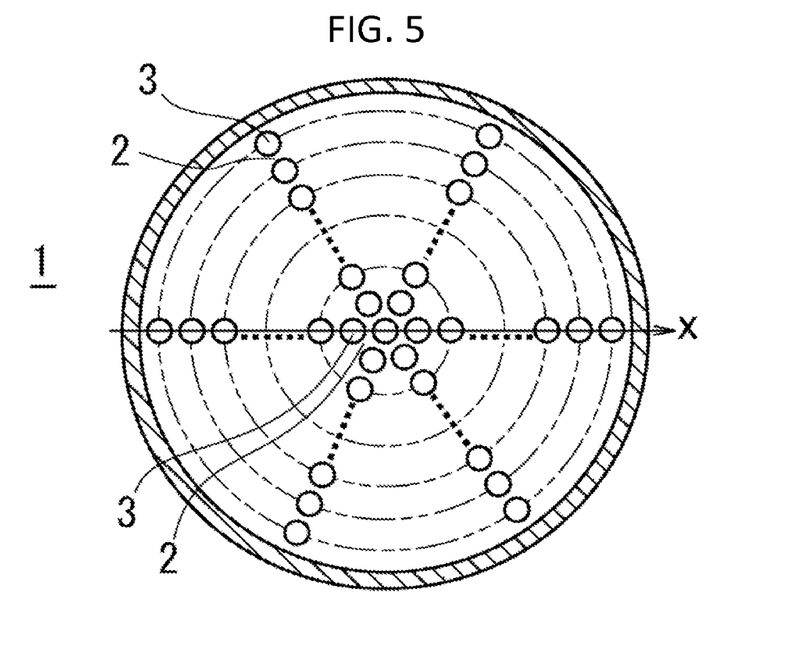
FIG. 5 is a cross sectional view of a plastic image fiber of the present invention.

FIG. 5 is a cross sectional view of an embodiment of the plastic image fiber of the present invention.

In FIG. 5, 1 denotes a plastic image fiber. The plastic image fiber 1 is several meter long. For example, the plastic image fiber 1 is about 1 to 6 meter long. In the present embodiment, the plastic image fiber 1 was 2 to 4 meter long. 2 denotes a cladding. 3 denotes a core. The core 3 is disposed within the cladding 2. The cladding 2 is always interposed between the neighboring cores 3. In FIG. 5, X indicates a direction perpendicular to a length direction of the plastic image fiber 1. The number of cores 3 is decided according to the number of pixels required. For example, the number of cores 3 is 1000 or greater. More preferably, the number of cores 3 is 2000 or greater. The cladding 2 and the core 3 are made of plastic.

Figure 6:
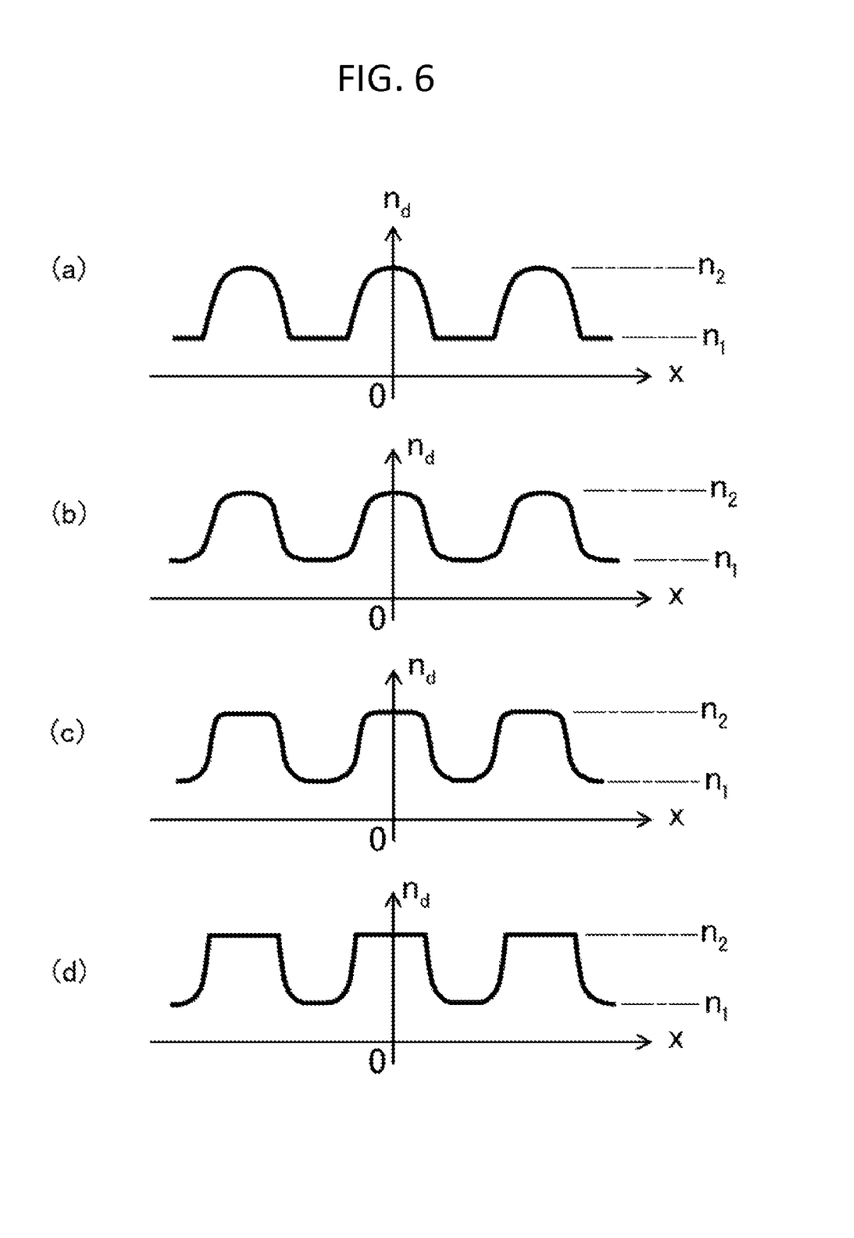
FIG. 6 are graphs each illustrating a change of an index of reflection of the plastic image fiber of the present invention.

Distribution of an index of reflection in each of the cladding 2 and the core 3 of the plastic image fiber 1 is illustrated in FIG. 6(*a*) to FIG. 6(*d*), respectively. In FIG. 6, a vertical axis ($n_d$) indicates an index of reflection of the plastic image fiber 1, and a horizontal axis (X) indicates a distance in a direction perpendicular to a length direction of the plastic image fiber 1. X in FIG. 6 corresponds to X in FIG. 5. An index of reflection of the cladding 2 is denoted by $n_1$. The maximum index of reflection of the core 3 is denoted by $n_2$. In FIG. 6, an index of reflection at each mount portion is the index of reflection in the core 3. In FIG. 6, an index of reflection at each valley portion is the index of reflection in the cladding 2. As known from FIG. 6, at the peripheral part of the core 3, the index of reflection continuously changes with respect to the distance X. An index of reflection at a position in the peripheral part of the core 3 on a center side of the core 3 is larger than an index of reflection at a position in the peripheral part of the core 3 on a side of the cladding 2. At the peripheral part of the core 3, an index of reflection changes with respect to the distance X based on the monotone decreasing function. An index of reflection of the core 3 at a position of the core contacting the cladding 2 is identical to an index of reflection of the cladding 2 at a position of the cladding contacting the core 3. In FIG. 6(*b*) to FIG. 6(*d*), in the peripheral part of the core 3 through a part of the cladding 2, a change ratio of an index of reflection with respect to the distance X is continuous at a boundary point between the cladding 2 and the core 3. A change ratio of an index of reflection (df(X)/dX) shown in FIG. 6(*a*) is not continuous at a boundary point between the cladding 2 and the core 3. A change ratio of an index of reflection (df(X)/dX) shown in FIG. 6(*d*) is not continuous at a certain part of the core 3. In FIG. 6(*b*) and FIG. 6(*c*), a change ratio of an index of reflection (df(X)/dX) is continuous in an area from a center part of the core 3 through an area of the cladding 2. In other words, in FIG. 6(*b*) and FIG. 6(*c*), the change ratio of the index of reflection (df(X)/dX) is continuous throughout the area. Preferred were the fibers having refractive index profile as shown in FIG. 6(*b*), FIG. 6(*c*), and FIG. 6(*d*). More preferred was the fiber having refractive index profile as shown in FIG. 6(*b*) or FIG. 6(*c*).

The fiber having the refractive index profile as shown in FIG. 6(*c*) or FIG. 6(*d*) has a constant area having a high index of reflection in the vicinity of the center part of the core 3. In other words, the core 3 has a large effective area. Therefore, the fiber of FIG. 6(*c*) or FIG. 6(*d*) has less problem of crosstalk and thus is excellent in resolution.

In the fiber having the refractive index profile as shown in FIG. 6(*b*), the index of reflection continuously changes in throughout the area from the center part of the core 3 through the peripheral part of the cladding 2. In other words, a change ratio of the index of reflection is small. Therefore, the fiber of FIG. 6(*b*) has only a small structure irregularity loss and thus is excellent in brightness.

To obtain a multi-pixel image fiber with a small diameter, the multi-pixel image fiber should be composed of many fibers, and each of the fibers should have a small diameter. In this case, it is preferred that ($n_2-n_1$) is a relatively large value. For example, in a step index type optical fiber (FIG. 3), normalized frequency (transmission characteristics) V of light can be expressed as follows.

$$V = (\pi d / \lambda)(n_2^2 - n_1^2)^{1/2}$$
$$\doteqdot (\pi d / \lambda)\{(2n_1)(n_2 - n_1)\}^{1/2}$$

Where d=diameter of core
$\lambda$=wavelength of propagating light
$n_1$=index of reflection of a cladding
$n_2$=index of reflection of a core
$n_1 \doteqdot n_2$ As the normalized frequency V becomes larger, the mode numbers of propagating light becomes greater. That is, the propagating light is trapped within a core.

When a diameter d of the core becomes small, light leaks toward the cladding. Thus leaked light comes into the neighboring core. This induces crosstalk, resulting in causing blur of an image. To solve the above problem, the value of ($n_2-n_1$) should be relatively large. A preferable value of ($n_2-n_1$) was 0.05 or greater.

Upon fabrication of the plastic image fiber, in each of the plastic fibers, an index of reflection continuously changes at its peripheral part. Each of the plastic fibers is a refractive index profile type fiber. There are various fabrication methods for fabricating such refractive index profile type fiber. The various fabrication methods include a method which uses a monomer reactivity ratio. The various fabrication methods further include a method which uses a difference in specific gravity of monomer (see, JP 1985-119510A). The various fabrication methods further include a method in which monomer having a high index of reflection is volatized while a plastic fiber is continuously extruded (see, JP 1987-108208A). The various fabrication methods further include a method in which monomer having a low index of reflection is diffused into a gelled cylindrical body from an outer peripheral part of the gelled cylindrical body (see, JP 2001-354711A). The various fabrication methods further include a method in which polymer having a high index of reflection is diffused from an inside of the hollow cylindrical body (WO1998/040768). The various fabrication methods further include a method which uses a centrifugal force caused by rotation of a cylindrical reaction container, and in which monomer is gradually laminated onto an inner circumference of the cylindrical reaction container while composition of the monomer is continuously or intermittently changed (see, JP 1985-119509A). The various fabrication methods further include a method in which cladding (polymer) is rotated, instead of the cylindrical container, to make monomer be laminated onto an inner circumference of the cladding (see, JP 1996-114715A). Methods to be employed in the present invention is not limited to the above listed ones. Many other methods can be employed. It is easy to obtain a refractive index profile type fiber having a large value of $(n_2-n_1)$ by the use of technique disclosed in JP 1985-119509A or JP 1996-114715A. An aggregate of the refractive index profile type fibers is integrated. Thus integrated body is thinned (drawn) in order to obtain the plastic image fiber 1.

Figure 7:
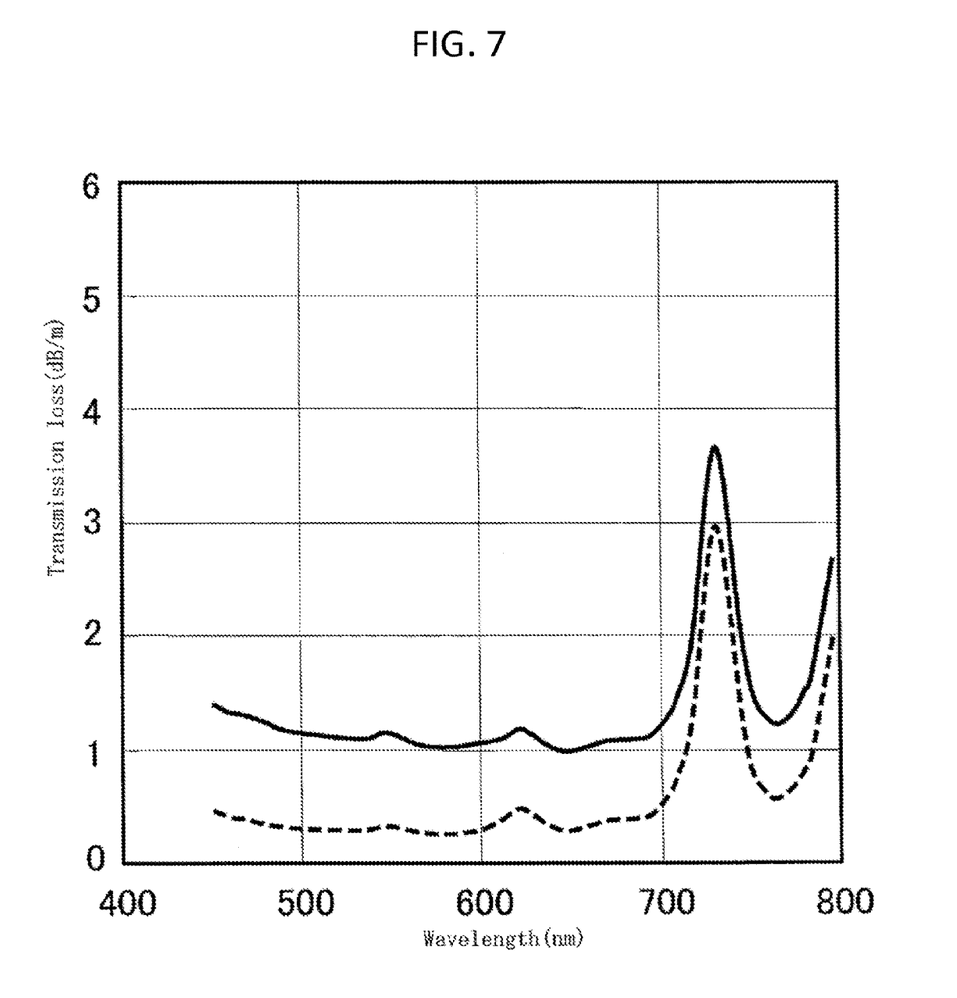
FIG. 7 is a graph illustrating a transmission loss characteristic of the plastic image fiber of the present invention.
Figure 8:
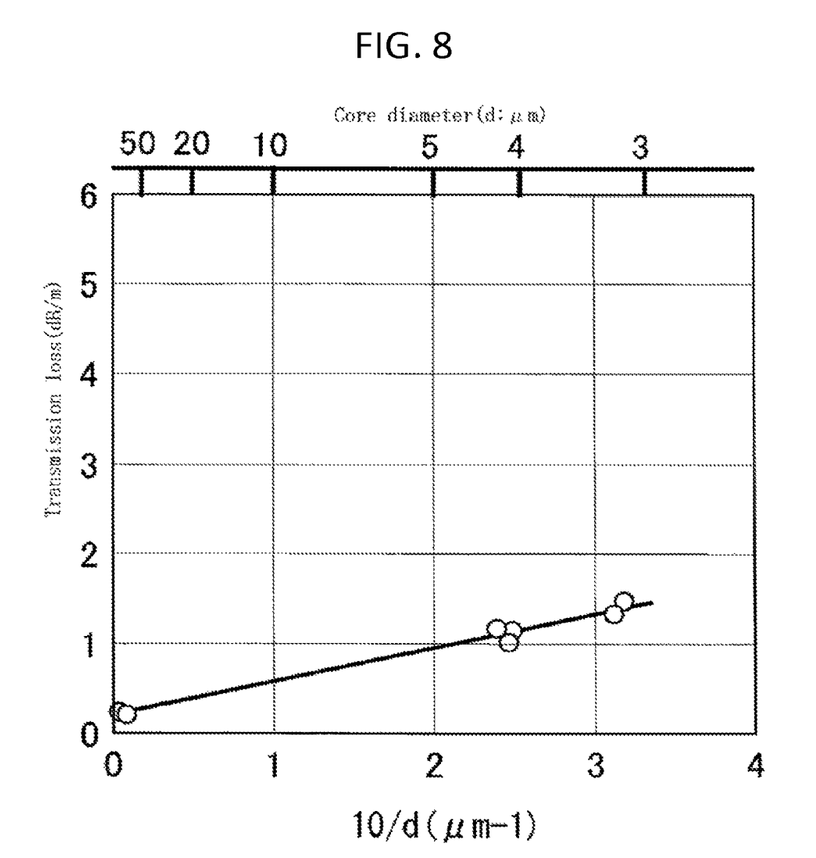
FIG. 8 is a graph illustrating another transmission loss characteristic of the plastic image fiber of the present invention.

An optical transmission loss of the plastic image fiber 1 that has a refractive index profile as shown in FIG. 6(b) will be described below (see, FIG. 7 and FIG. 8). FIG. 7 is a graph illustrating a wavelength-transmission loss. In FIG. 7, an upper line (solid line) shows an optical transmission loss of a plastic image fiber (core diameter of 4.2 μm; the number of cores of 5000; and outer diameter of cladding of 500 μm). In FIG. 7, a lower line (dotted line) shows an optical transmission loss of a plastic monofiber (core diameter of 780 μm; and outer diameter of cladding of 1000 μm). FIG. 8 is a graph illustrating a core diameter-transmission loss of light (wavelength of 500 nm). It is known that transmission characteristics are remarkably improved in the plastic image fiber 1 of the embodiment (when FIG. 1 is compared with FIG. 7 or when FIG. 2 is compared with FIG. 8). For example, even a transmission loss of a plastic image fiber having a core diameter of 4.2 μm does not remarkably increase in comparison with that of a monofiber having an outer diameter of 1 mm (core diameter of 780 μm). In a case of the monofiber, a transmission loss of light (wavelength=500 nm) was 0.3 dB/m (transmittance of 93.3%/m). In a case of the plastic image fiber, a transmission loss of light (wavelength=500 nm) was 1.2 dB/m (transmittance of 75.9%/m).

Figure 9:
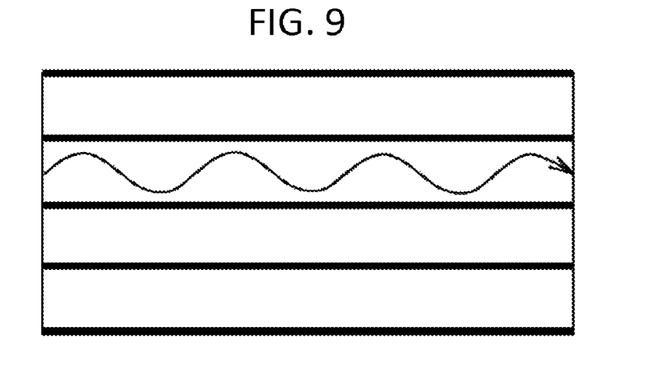
FIG. 9 illustrates a light propagation state in the plastic image fiber of the present invention.

The reason why the transmission characteristics of the plastic image fiber 1 that has the above described refractive index profile is excellent can be understood from the following description. A light propagation state within a core is illustrated in FIG. 9. Apart from FIG. 4(c), the light does not propagate while totally reflecting within a core in FIG. 9. In FIG. 9, the light propagates showing like a sinusoidal curve. As a result thereof, a scattering loss hardly occurs. In other words, the transmission characteristics improved.

Examples will be described below in more detail. The present invention, however, is not limited to the following examples. It is therefore to be understood that unless such changes and modifications otherwise depart from the spirit and scope of the present invention, they should be construed as being included therein.

Example 1

Figure 10:
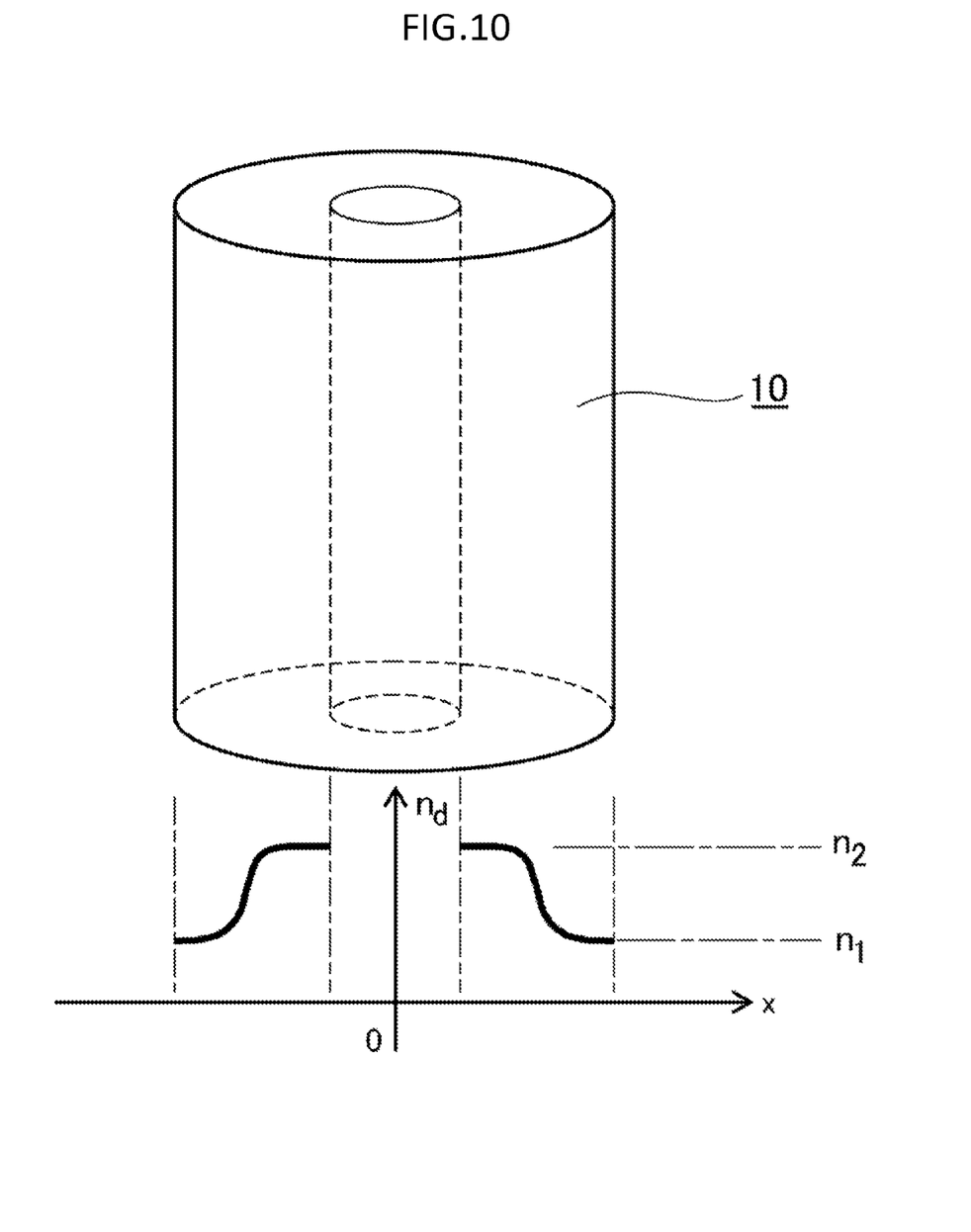
FIG. 10 illustrates a refractive index profile pipe.

A cylindrical glass container (internal diameter of 70 mm) is placed horizontally within an air thermostat that is kept at 70° C. The cylindrical container is rotated (500 rotations/min.). Under the conditions, a mixture is injected through an inlet at one edge that is oriented in parallel with a rotation axis of the cylindrical container. The mixture was composed of a polymerization initiator, a chain-transfer agent for modifying molecular weight, a monomer having a low index of reflection (2,2,2-trifluoroethyl methacrylate: an index of reflection of polymer of 1.42), and a monomer having a high index of reflection (methyl methacrylate: an index of reflection of polymer of 1.49). Only the monomer having the low index of reflection was injected. Only the monomer having the high index of reflection was injected. More specifically, only the monomer having the low index of reflection was injected into the outermost peripheral part of the cylindrical container. Only the monomer having the high index of reflection was injected into the innermost peripheral part of the cylindrical container. The mixture was injected into an intermediate part between the outermost peripheral part and the innermost peripheral part of the cylindrical container. Within the intermediate part, the monomer having the high index of reflection becomes greater in rate on the inner peripheral side, and the monomer having the low index of reflection becomes greater in rate on the outer peripheral side. A composition ratio of the monomer changed almost continuously. An injection rate of the monomer (rate of sedimentation) was 1 mm/hr. An injecting time was 25 hours. After the injection, the cylindrical container was rotated for 3 hours. Then, the cylindrical container was heated (3 hours at 120° C.). As a result thereof, a refractive index profile pipe 10 (see, FIG. 10) was obtained. The pipe 10 had the outermost peripheral diameter of 70 mm and the innermost peripheral diameter of 20 mm. A refractive index profile of the pipe 10 is shown (lower position of FIG. 10). An index of reflection of the pipe 10 at its innermost peripheral part (10 mm away from its center) was $n_2$ (1.49). An index of reflection of the pipe 10 at its outermost peripheral part (35 mm away from its center) was $n_1$ (1.42). An index of reflection of the pipe 10 at its intermediate part almost continuously changed from 1.49 to 1.42.

Figure 12:
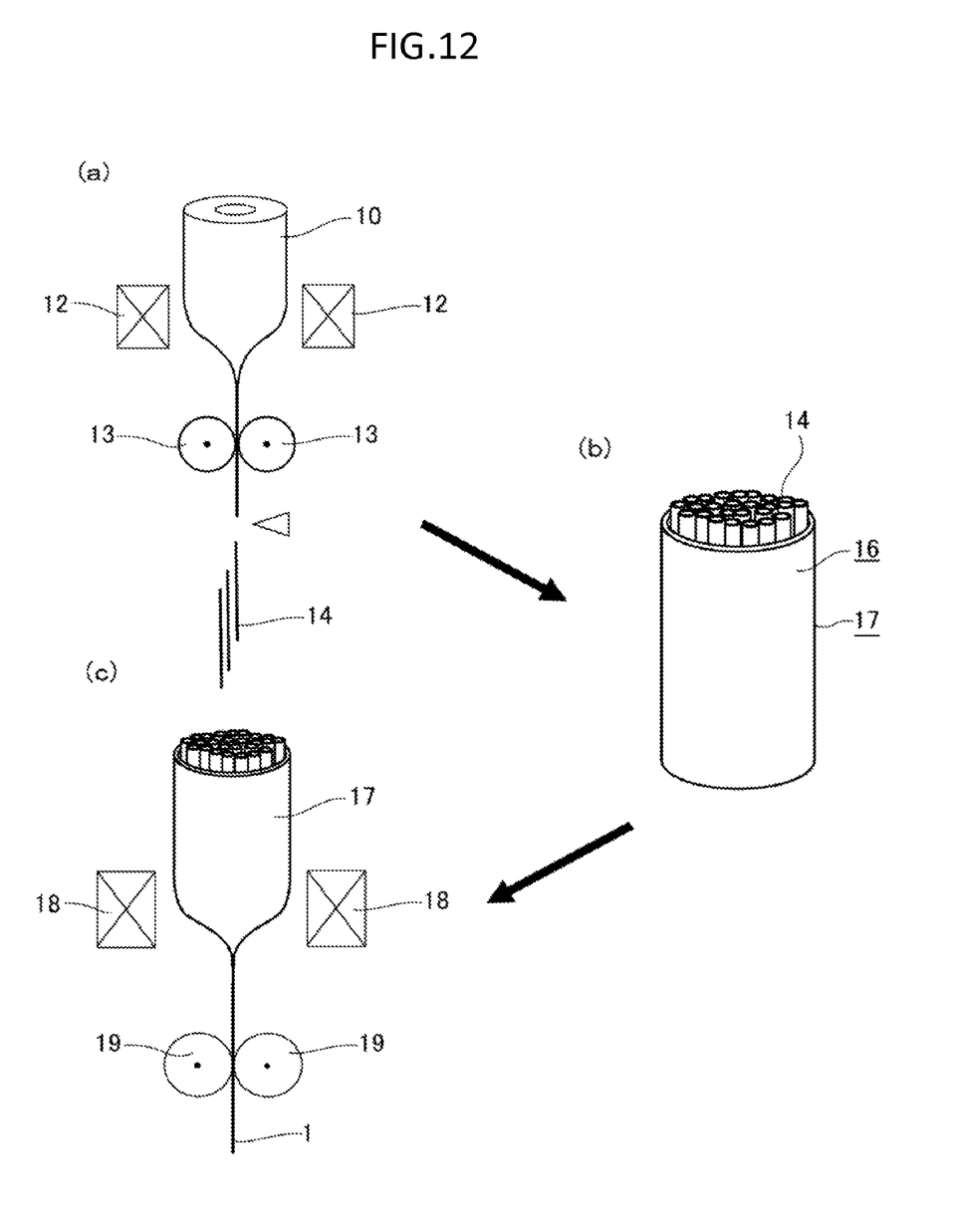
FIG. 12 illustrates a fabrication step of fabrication of the plastic image fiber of the present invention.

Then, the plastic image fiber 1 was obtained via a step illustrated in FIG. 12.

Initially, a tip of the pipe 10 was heated by using a heater 12. A hollow part of the pipe 10 was decompressed. Drawing of the pipe 10 was performed with the pipe 10 being pinched by rollers 13, 13. Thus obtained outer diameter of the thinned line 14 was 1 mm. The hollow part was eliminated from the thinned line 14. This thinned line 14 was cut (300 mm long) (see, FIG. 12(a)). A diameter of a core of the thinned line 14 (a part having a high index of reflection) was 780 μm.

3900 pieces of the thinned line 14 were inserted into a transparent polymethyl methacrylate pipe (outer diameter of 70 mm; and thickness of 2 mm) 16. As a result thereof, an aggregate 17 was obtained (see, FIG. 12(b)).

An inside of the pipe 16 was decompressed. A tip of the aggregate 17 was heated by a heater 18. Drawing of the pipe 16 was performed with the pipe 16 being pinched by rollers 19, 19. As a result thereof, the plastic image fiber 1 was obtained (see, FIG. 12(c)). An outer diameter of the fiber 1 was 500 μm.

Transmission characteristics of the plastic image fiber 1 was investigated. From the investigation, the above described results were obtained.

Example 2

In the Example 1, the pipe 10 was fabricated and was subjected to the drawing (thinning).

Figure 11:
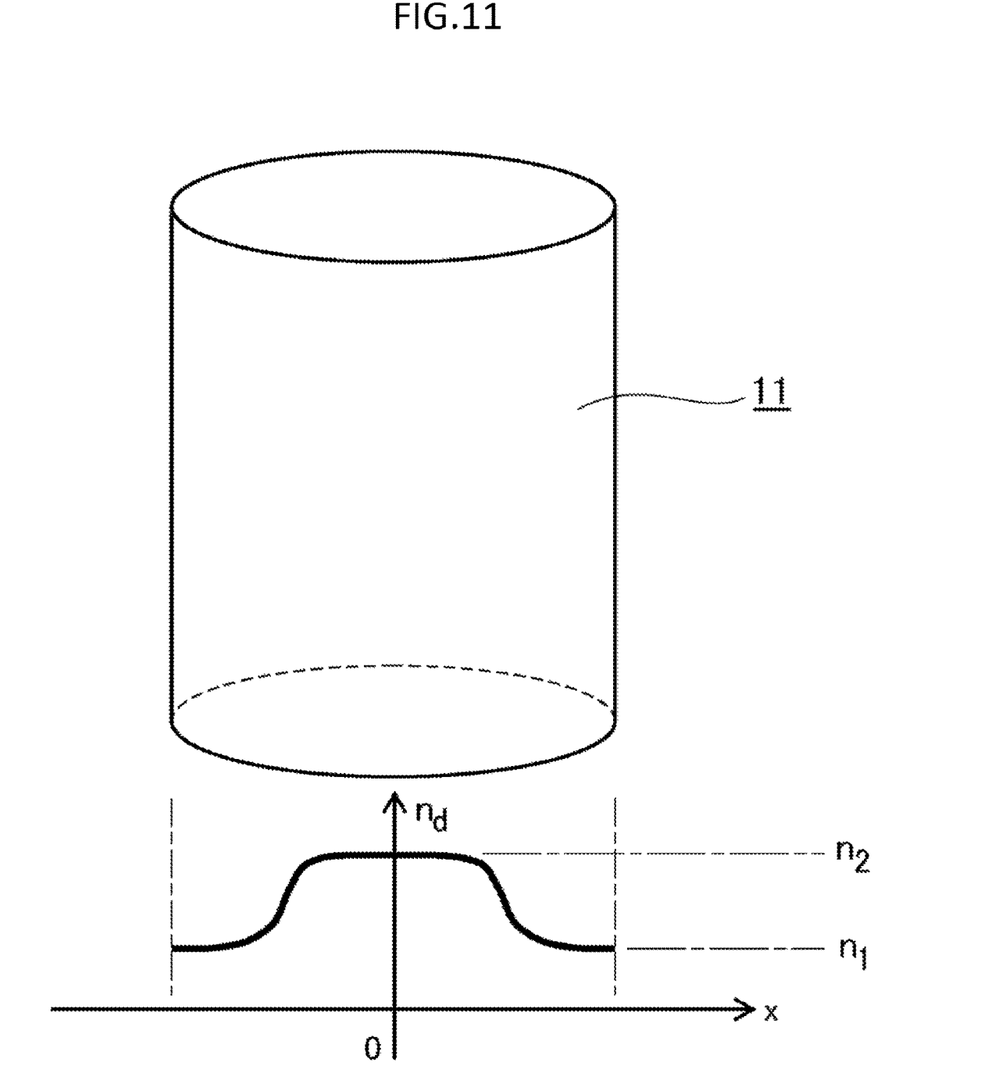
FIG. 11 illustrates a preform rod.

In the present example, a preform rod 11 was initially fabricated. When fabricating the preform rod 11, the pipe 10 was fabricated in a manner similar to that performed in the Example 1, and thereafter, the cylindrical container was horizontally placed with its inlet being oriented upwardly. Then, only the monomer having high index of reflection was injected through the inlet. Subsequently, polymerization was performed by heating (at 70° C. for 6 hours and, subsequently, at 120° C. for 3 hours). This enables obtainment of the preform rod 11 having a diameter of 70 mm without including a hollow part (see, FIG. 11). A refractive index profile of the preform rod 11 is illustrated (lower position of FIG. 11).

Thinning was performed in a manner similar to that performed in the Example 1 except that the preform rod 11 was used instead of the pipe 10. A thinned line 15 (not shown) was obtained. An outer diameter of the thinned line 15 was 1 mm. The thinned line 15 was cut (300 mm long) (see, FIG. 12(a)). A diameter of a core of the thinned line 15 (a part having a high index of reflection) was 800 μm.

Next, a plastic image fiber was obtained in a manner similar to that performed in the Example 1 except that the thinned lines 15, instead of the thinned lines 14, were inserted into the polymethyl methacrylate pipe 16. An outer diameter of the fiber was 500 μm.

Transmission characteristics of the plastic image fiber obtained in the present example was also excellent.

Example 3

Figure 13:
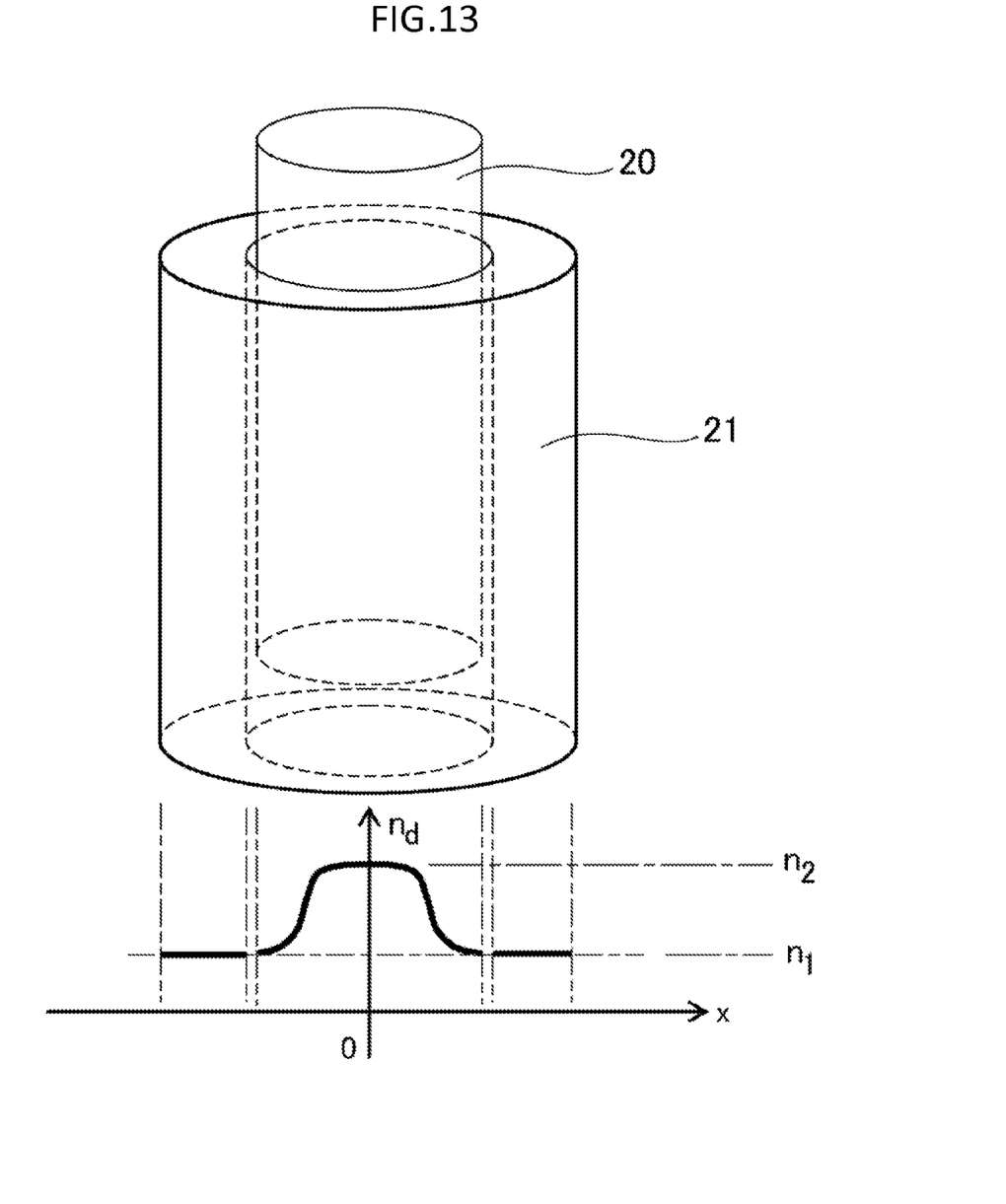
FIG. 13 illustrates a composite body.

A step was performed in a manner similar to that performed in the Example 2. A preform rod 20 having a configuration similar to the preform rod 11 was obtained. Then, the preform rod 20 was inserted into a pipe 21 (see, FIG. 13). The pipe 21 is made of 2,2,2-trifluoroethyl methacrylate polymer. A refractive index profile of this composite body is shown (lower position of FIG. 13). Subsequently, a step was performed in a manner similar to that performed in the Example 1 (step of FIG. 12).

Transmission characteristics of the plastic image fiber obtained in the present example was also excellent.

Example 4

A step was performed in a manner similar to that performed in the Example 1. A pipe 22 having a configuration similar to the pipe 10 was obtained. The pipe 22 has the outermost peripheral diameter of 70 mm and the innermost peripheral diameter of 57 mm. An index of reflection of the pipe 22 at a position of the innermost peripheral part of the pipe 22 (at a position 28.5 mm away from its center) was $n_2$ (1.49). An index of reflection of the pipe 22 at a position of the outermost peripheral part of the pipe 22 (at a position 35 mm away from its center) was $n_1$ (1.42). An index of reflection of the pipe 22 at an intermediate part of the pipe 22 almost continuously changed from 1.49 to 1.42.

A polymethyl methacrylate preform rod 23 having a diameter of 56 mm was fabricated.

Figure 14:
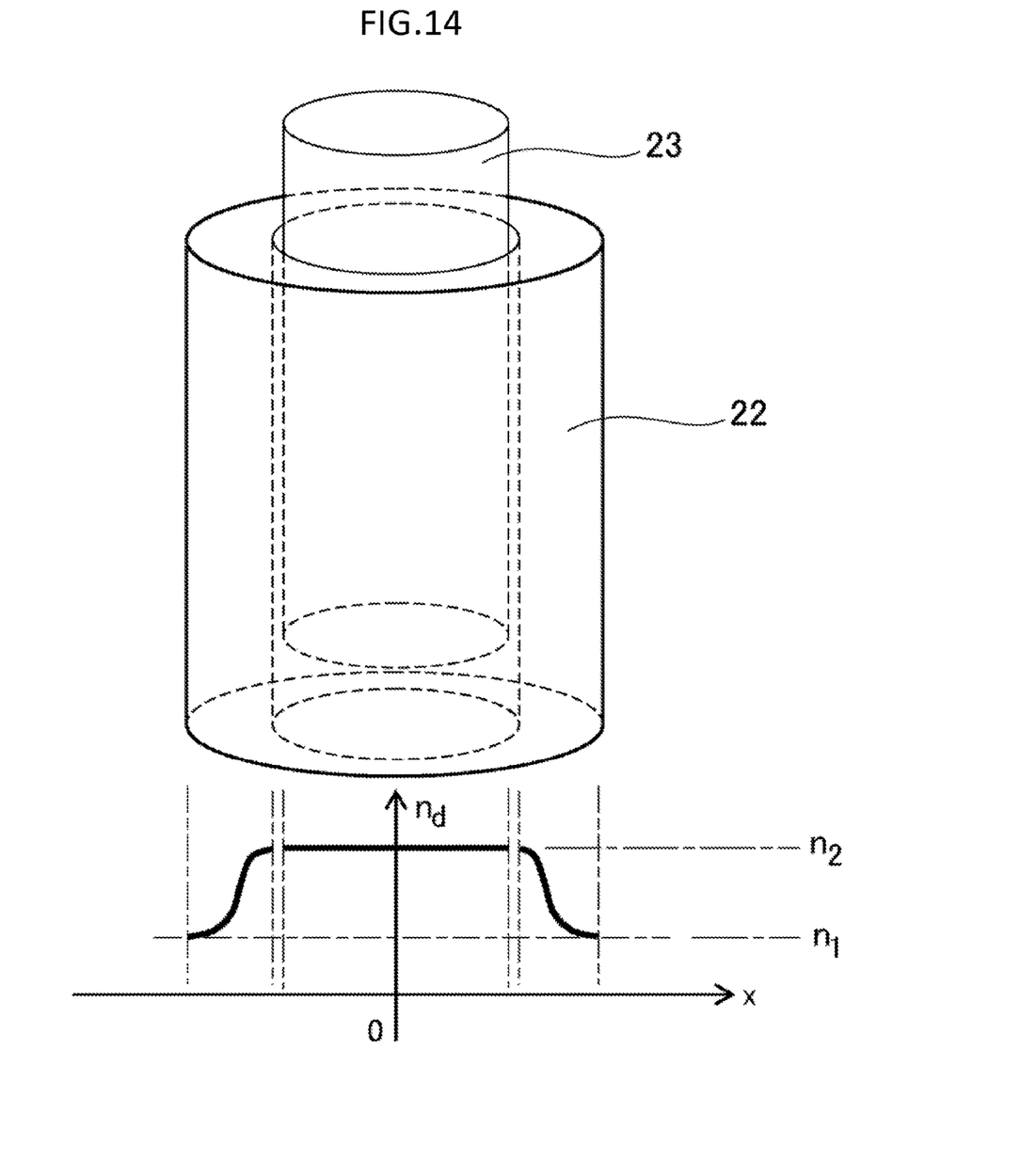
FIG. 14 illustrates another composite body.

The preform rod 23 was inserted into the pipe 22. A refractive index profile of this composition body is shown (lower position of FIG. 14). Then, a step was performed in a manner similar to that performed in the Example 1 (step of FIG. 12).

Transmission characteristics of the plastic image fiber obtained in the present example was also excellent.

Comparison Example 1

A polystyrene rod was inserted into a polymethyl methacrylate pipe. The polystyrene rod had a diameter of 56 mm and an index of reflection of 1.59. The polymethyl methacrylate pipe had the outermost peripheral diameter of 70 mm, the innermost peripheral diameter of 57 mm, and an index of reflection of 1.49. Then, the composite body was subjected to a step similar to that performed in the Example 1 (step of FIG. 12). A refractive index profile of the plastic image fiber of the present Comparison Example was the step index type as shown in FIG. 3(b).

Transmission characteristics of the plastic image fiber of the present Comparison Example 1 was not an acceptable level.

Comparison Example 2

A polymethyl methacrylate rod was inserted into a 2,2,2-trifluoroethyl methacrylate pipe. The polymethyl methacrylate rod had a diameter of 56 mm and an index of reflection of 1.49. The 2,2,2-trifluoroethyl methacrylate pipe had the outermost peripheral diameter of 70 mm, the innermost peripheral diameter of 57 mm, and an index of reflection of 1.42. Then, the composite body was subjected to a step similar to that performed in the Example 1 (step of FIG. 12). A refractive index profile of the plastic image fiber of the present Comparison Example was the step index type as shown in FIG. 3(b).

Transmission characteristics of the plastic image fiber of the present Comparison Example 2 was not an acceptable level.

REFERENCE CHARACTER LIST 1 plastic image fiber
2 cladding
3 core
10, 21 pipe
11, 20 preform rod
12, 18 heater
13, 19 roller
14 thinned line
15 thinned line
16 polymethyl methacrylate pipe
17 aggregate
22 pipe
23 preform rod

The invention claimed is:

1. A plastic image fiber, comprising:
N number of cores which are disposed within a cladding, where N is an integer equal to or greater than 2;
wherein:
each of the cores has an index of refraction that continuously changes at a peripheral part of the core;
the index of refraction at the peripheral part on a center side of the core is greater than the index of refraction at the peripheral part on a cladding side;
the index of refraction in a region extending from the peripheral part of the core to a position in the cladding adjacent to the core has a value given by a function f(x), x being a distance from a center of the core; and
a change ratio of index of refraction from the peripheral part of the core to the position in the cladding adjacent to the core, defined as (df(x)/dx), is continuous.

2. The plastic image fiber according to claim 1, wherein:
each core has a diameter of 1 μm to 20 μm; and
N is equal to or greater than 1000.

3. The plastic image fiber according to claim 1, wherein index of refraction from the peripheral part of the core through the position in the cladding adjacent to the core is expressed by a monotone decreasing function.

4. The plastic image fiber according to claim 3, wherein index of refraction from a center part of the core to the position in the cladding adjacent to the core is expressed by a monotone decreasing function.

5. The plastic image fiber according to claim 1, wherein $[n_2-n_1]$ is equal to or greater than 0.05, where $n_2$ represents the maximum index of refraction in the core and $n_1$ represents the minimum index of refraction in the cladding.

6. The plastic image fiber according to claim 4, wherein:
the index of refraction from the center of the core to the position in the cladding adjacent to the core is given by the function f(x); and
a change ratio of index of refraction from the center of the core to the position in the cladding adjacent to the core, defined as (df(x)/dx), is continuous.

7. A method for fabricating a plastic image fiber, the method comprising:
fabricating an aggregate of plastic fibers by binding a plurality of the plastic fibers;
heating and integrating the aggregate of plastic fibers into an integrated body; and
thinning the integrated body to obtain the plastic image fiber;
wherein:
the plastic image fiber comprises N number of cores disposed within a cladding, where N is an integer equal to or greater than 2;
each of the cores has an index of refraction that continuously changes at a peripheral part of the core;
the index of refraction at the peripheral part on a center side of the core is greater than the index of refraction at the peripheral part on a cladding side;
the index of refraction in a region extending from the peripheral part of the core to a position in the cladding adjacent to the core has a value given by a function f(x), x being a distance from a center of the core; and
a change ratio of index of refraction from the peripheral part of the core to the position in the cladding adjacent to the core, defined as (df(x)/dx), is continuous.

8. The method according to claim 7, wherein, in each of the plastic fibers, an index of refraction at its peripheral part is expressed by a monotone decreasing function.

9. The method according to claim 8, wherein, in each of the plastic fibers, an index of refraction from its center part to its peripheral part is expressed by a monotone decreasing function.

10. The method according to claim 7, wherein, in each of the plastic fibers, the same index of refraction distributes at a predetermined range of its peripheral part.

11. The method according to claim 7, wherein:
a diameter of each core is in a range between 1 μm and 20 μm,
N is equal to or greater than 1000, and
an outer diameter of the cladding is equal to or less than 4 mm.

12. The method according to claim 7, wherein $[n_2-n_1]$ is equal to or greater than 0.05, where $n_2$ represents the maximum index of refraction in the core and $n_1$ represents the minimum index of refraction in the cladding.

13. The plastic image fiber according to claim 1, wherein a distance between edges of adjacent cores is in a range of from 0.5 μm to 10 μm.

14. The plastic image fiber according to claim 1, wherein a distance between edges of adjacent cores is in a range of from 0.6 μm to 3 μm.

15. The plastic image fiber according to claim 1, wherein the plastic image fiber is about 1 to 6 meters long.

16. The plastic image fiber according to claim 1, wherein
a diameter of the core is equal to or less than 15 μm; and
the number of the cores is equal to or greater than 2000.

17. The plastic image fiber according to claim 4, wherein:
the index of refraction throughout a cross sectional area of the plastic image fiber is given by the function f(x'), x' being a distance from a center of the plastic image fiber; and
a change ratio of index of refraction throughout a cross sectional area of the plastic image fiber, defined as (df(x')/dx'), is continuous.

* * * * *